United States Patent
Parsons et al.

(10) Patent No.: US 9,779,173 B2
(45) Date of Patent: Oct. 3, 2017

(54) RECORDING AND TRANSMITTING A NETWORK USER'S NETWORK SESSION

(75) Inventors: Robert R. Parsons, Scottsdale, AZ (US); Shawn M. Fitzpatrick, Phoenix, AZ (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 1739 days.

(21) Appl. No.: 11/776,795

(22) Filed: Jul. 12, 2007

(65) Prior Publication Data

US 2007/0260632 A1 Nov. 8, 2007

(51) Int. Cl.
G07C 5/08 (2006.01)
G06F 17/30 (2006.01)

(52) U.S. Cl.
CPC .................. G06F 17/3089 (2013.01)

(58) Field of Classification Search
CPC ............ H04N 5/44543; G06F 17/3089; G06F 17/2827; G06F 17/3087
USPC .................................................. 709/231, 206
See application file for complete search history.

(56) References Cited

U.S. PATENT DOCUMENTS

| | | | |
|---|---|---|---|
| 6,223,213 B1* | 4/2001 | Cleron et al. ................. 709/206 |
| 6,237,138 B1 | 5/2001 | Hameluck et al. | |
| 6,421,738 B1 | 7/2002 | Ratan et al. | |
| 6,460,075 B2 | 10/2002 | Krueger et al. | |
| 6,573,915 B1 | 6/2003 | Sivan et al. | |
| 6,864,901 B2 | 3/2005 | Chang et al. | |
| 6,963,903 B2* | 11/2005 | Krueger ............... G06Q 10/107 709/203 |
| 7,076,495 B2 | 7/2006 | Dutta et al. | |
| 7,184,918 B2 | 2/2007 | Hamilton et al. | |
| 7,194,513 B2 | 3/2007 | Sharif et al. | |
| 7,359,935 B1* | 4/2008 | Karipides et al. ............ 709/203 |
| 7,392,321 B1* | 6/2008 | Wolf et al. .................... 709/232 |
| 7,822,807 B2* | 10/2010 | Yoshimine .......... G06F 17/3089 709/203 |
| 2002/0016848 A1* | 2/2002 | Yoshimine .......... G06F 17/3089 709/231 |
| 2002/0194288 A1* | 12/2002 | Krueger ............... G06Q 10/107 709/206 |
| 2003/0172116 A1* | 9/2003 | Curry et al. ................... 709/206 |
| 2004/0006509 A1* | 1/2004 | Mannik ............. G06F 17/30017 705/14.55 |
| 2004/0158429 A1* | 8/2004 | Bary .................... G06F 17/3089 702/183 |
| 2005/0240596 A1* | 10/2005 | Worthen ............. G06F 17/3089 |

(Continued)

*Primary Examiner* — Khaled Kassim
*Assistant Examiner* — Syed S Ali
(74) *Attorney, Agent, or Firm* — Quarles & Brady LLP

(57) ABSTRACT

Systems and methods of the present invention allow for recording and transmitting a network user's network session. In an example embodiment, an Internet user may, though a client, access a website having a Multimedia File Recorder and a Multimedia File Sender. The Internet user may (by accessing a Control Panel on the website that controls the Multimedia File Recorder) record a multimedia file of his Internet session. Upon completion, the multimedia file may be transmitted to the website operator via a file streaming system, a file transfer system, or an email messaging system, each of which may reside on a server that is communicatively coupled to the client through a network.

50 Claims, 12 Drawing Sheets

(56) References Cited

U.S. PATENT DOCUMENTS

| | | | |
|---|---|---|---|
| 2005/0254775 A1* | 11/2005 | Hamilton | G06F 9/4443 386/210 |
| 2008/0103906 A1* | 5/2008 | Singh | G06F 17/30017 705/14.64 |
| 2008/0155411 A1* | 6/2008 | Christensen | G06F 17/3089 715/710 |
| 2008/0162506 A1* | 7/2008 | Stephenson | G06F 17/3089 |
| 2008/0195712 A1* | 8/2008 | Lin et al. | 709/206 |
| 2009/0016522 A1* | 1/2009 | Torres et al. | 379/265.06 |
| 2009/0070689 A1* | 3/2009 | Park | G06F 17/3089 715/760 |
| 2011/0029504 A1* | 2/2011 | King | G06F 17/30011 707/709 |
| 2012/0151530 A1* | 6/2012 | Krieger | H04N 5/44543 725/51 |

* cited by examiner

RECORDING AND TRANSMITTING A NETWORK USER'S NETWORK SESSION

FIELD OF THE INVENTION

The present inventions relate generally to the field of computer networks and, more specifically, systems and methods for recording and transmitting a network user's network session.

BACKGROUND OF THE INVENTION

A network is a collection of links and nodes (i.e.—multiple computers and/or other devices connected together) arranged so that information may be passed from one part of the network to another over multiple links and through various nodes. Examples of networks include the Internet, the public switched telephone network, the global Telex network, computer networks (i.e.—an intranet, an extranet, a local-area network, or a wide-area network), wired networks, and wireless networks.

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information (i.e.—text, graphics, audio, video, animation, and other forms of data) at specific locations on the Internet referred to as websites. The combination of all the websites and their corresponding webpages on the Internet is generally known as the World Wide Web (WWW) or simply the Web.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or NETSCAPE NAVIGATOR. After the browser has located the desired webpage, it requests and receives information from the webpage, typically in the form of an HTML document, and then displays the webpage content for the user. The user may then view other webpages at the same website or move to an entirely different website using the browser.

Browsers are able to locate specific websites because each website on the Internet has a unique Internet Protocol (IP) address. Each IP address is a 32 bit binary number, but is typically shown in dotted decimal notion (i.e.—192.145.68.112) to improve human readability. IP addresses, however, even in dotted decimal notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

For Internet users and businesses alike, the Internet continues to be increasingly valuable. More people are using the Web for everyday tasks, from shopping, banking, and paying bills to consuming media and entertainment. E-commerce is growing, with businesses delivering more services and content across the Internet, communicating and collaborating online, and inventing new ways to connect with each other.

Websites allow individuals and businesses to share their information with a large number of Internet users. Many products and services are offered for sale on the Internet, thus elevating the Internet to an essential tool of commerce. Internet businesses, whether large corporations or individuals, are rapidly creating websites to take advantage of the growing number of customers using the Internet and customers' increasing willingness to purchase goods and services over the Web. Websites created by Internet businesses may be reached by millions of Internet-savvy customers, thereby allowing Internet businesses to offer their products and services to a very large pool of potential customers.

With the expanding use of websites for commerce, it is important that websites are easy to use and function properly. "Usability" refers to the ease with which people can use a website to achieve a particular goal. It also can refer to the methods of measuring usability and the study of the principles behind an object's perceived efficiency or elegance. In human-computer interaction and computer science, usability usually refers to the elegance and clarity with which a website is designed.

To assess and improve website usability and functionality, website operators often employ "usability testing," a means for measuring how well people can use a website. Usability testing may involve watching people use the website for its intended purpose. For example, a website operator may wish to observe an Internet user using the operator's website to measure the relative ease with which it is used. The website operator may also wish to observe the computer screen as the user navigates through the website. If usability testing uncovers difficulties, such as people having difficulty understanding instructions, manipulating links, or interpreting feedback, then developers may improve the website's design and test it again.

It also is important that a website function properly. As a quality assurance measure, a website operator may wish to employ website monitoring to collect real time data about website error type, severity, and/or frequency. Such monitoring may reveal quality-related information about the website. Identified errors may be corrected, thereby improving the website's functionality.

If the website operator is a business, valuable marketing information may be gleaned from the manner in which customers use the website. For example, the amount of time a customer spends looking at an item for sale on a webpage may indicate the desirability of the item. Similarly, the location of the cursor on a webpage may indicate which product in a lineup of products the customer intrinsically prefers.

Presently-existing systems and methods include those that accomplish usability testing by recording screen content and user response (U.S. Pat. No. 7,184,918 to Hamilton, et al.). But these systems and methods do not disclose a website-based system that allows a user to record and submit a recording of his Internet session to the website operator.

In response to the issues discussed above, there is a need for new systems and methods for recording and transmitting a network user's network session including, but not limited to, systems and methods for recording and submitting an Internet user's Internet session to a website operator for usability, quality assurance, or marketing analysis.

SUMMARY OF THE INVENTION

The needs cited above and the limitations of the prior art are substantially overcome through the systems and methods disclosed herein. The systems and methods of the present inventions allow for efficient recording and transmitting of a network user's network session including, but not limited to, systems and methods for recording and submitting an Internet user's Internet session to a website operator for usability, quality assurance, or marketing analysis.

In an example embodiment, an Internet user may access a website having a Multimedia File Recorder and a Multimedia File Sender. The website may be accessed by any client (i.e.—computer, terminal, wireless device, etc.) connected to the Internet via a network. The Internet user may (by accessing a Control Panel on the website that controls the Multimedia File Recorder) record a multimedia file of his Internet session. Upon completion, the multimedia file may be transmitted to the website operator via a file streaming system, a file transfer system, or an email messaging system, each of which may reside on a server that is communicatively coupled to the client through a network.

An exemplary system includes a network, a server connected to the network, a client connected to the network, and a website (accessible though the client) that has a Multimedia File Recorder and a Multimedia File Sender. The website may also have a Control Panel for controlling the Multimedia File Recorder that may allow a user to start and end a recording session. The Multimedia File Recorder may comprise a Screen Capture Tool, a Video File Recorder, an Audio File Recorder, or any combination thereof. The Multimedia File Sender may comprise an email messaging system (that sends a recorded multimedia file as an email attachment to a Receiver), a file transfer system (that transfers the multimedia file to a file server accessible by the Receiver), a file streaming system (that streams the multimedia file to the Receiver via a Streaming Media Server), or any combination thereof. The system may also comprise Recording Software for running the Multimedia File Recorder that may reside on the server, the client, or both. Similarly, Sending Software for running the Multimedia File Sender may reside on the server, the client, or both.

In an exemplary method, a network user accesses a website, records a network session, and transmits the network session to a Receiver. The user may record the network session by accessing means for recording a multimedia file and creating a multimedia file of the network session. The multimedia file may then be (manually or automatically) emailed, transferred, or streamed to the Receiver, who may be an individual, an entity, an automated system, a domain name registrar, a domain name registry, a reseller of a domain name registrar, an Internet service provider, a software developer, a website designer, a website operator, or any combination thereof.

The above features and advantages of the present invention will be better understood from the following detailed description taken in conjunction with the accompanying drawings.

DETAILED DESCRIPTION

Figure 1:
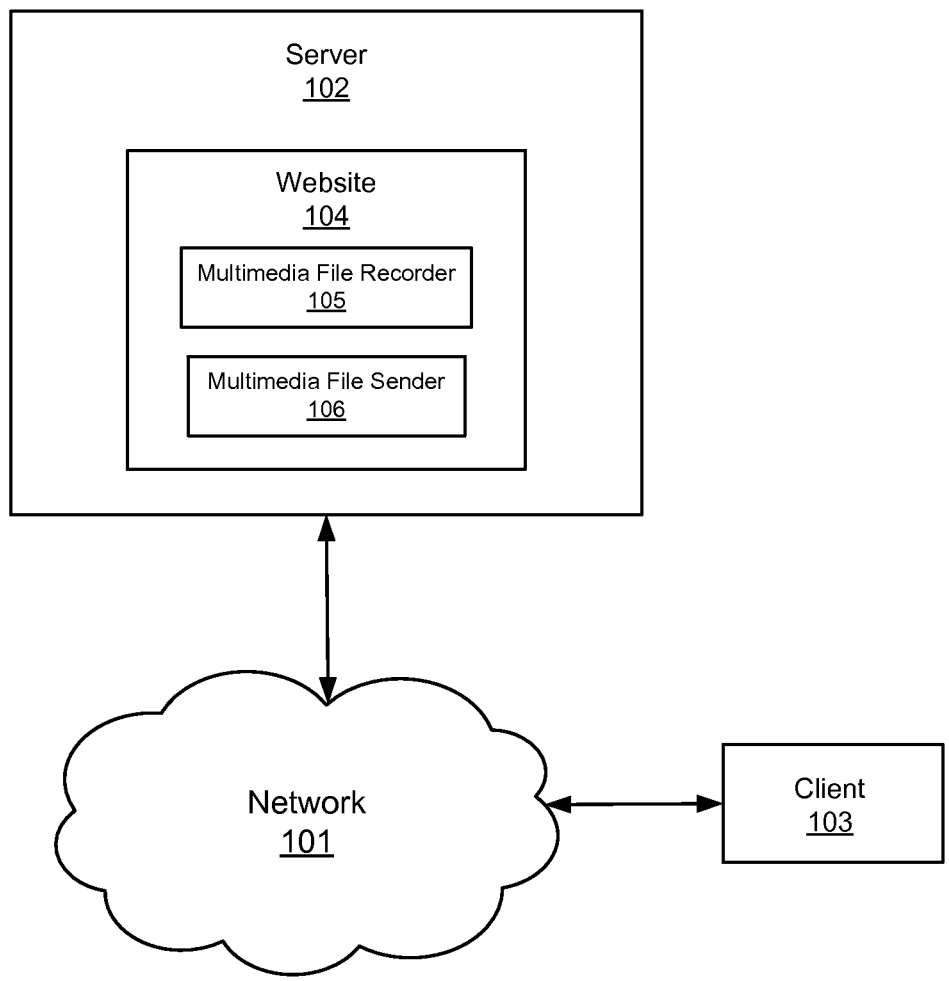
FIG. 1 illustrates a possible embodiment of a system for recording and transmitting a network user's network session.

The present invention will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

A streamlined example embodiment of a system for recording and transmitting a network user's network session is illustrated in FIG. 1. The illustrated embodiment includes a network 101, at least one server 102, at least one client 103, and a website 104. The server 102 and client 103 may be connected to the network 101. This embodiment places no limitation on network configuration or connectivity. The website 104 comprises a Multimedia File Recorder 105 and a Multimedia File Sender 106 and may be hosted on either the server 102. The website 104 may accessed through the client 103 (i.e.—computer, terminal, wireless device, etc.) that is connected to the network 101.

Figure 2:
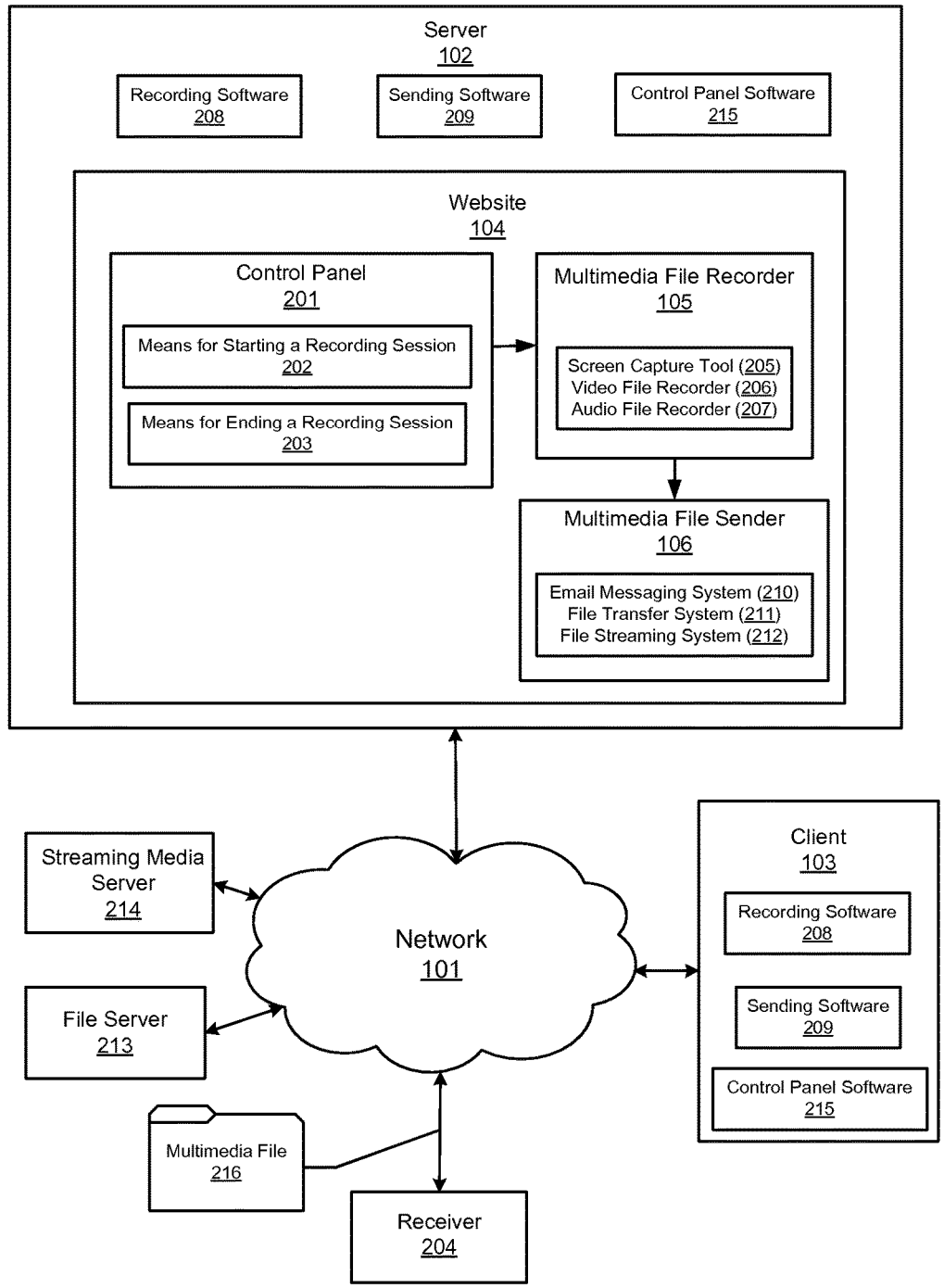
FIG. 2 illustrates a possible embodiment of a system for recording and transmitting a network user's network session

A more detailed example embodiment of a system for recording and transmitting a network user's network session is illustrated in FIG. 2. The illustrated embodiment includes a network 101, at least one server 102, at least one client 103, a website 104 (accessible through the client 103) having a Control Panel 201; a Multimedia File Recorder 105; and a Multimedia File Sender 106, and a Receiver 204. The at least one server 102 and at least one client 103 may be connected to the network 101. The website 104 may be hosted on the at least one server 102.

Figure 4:
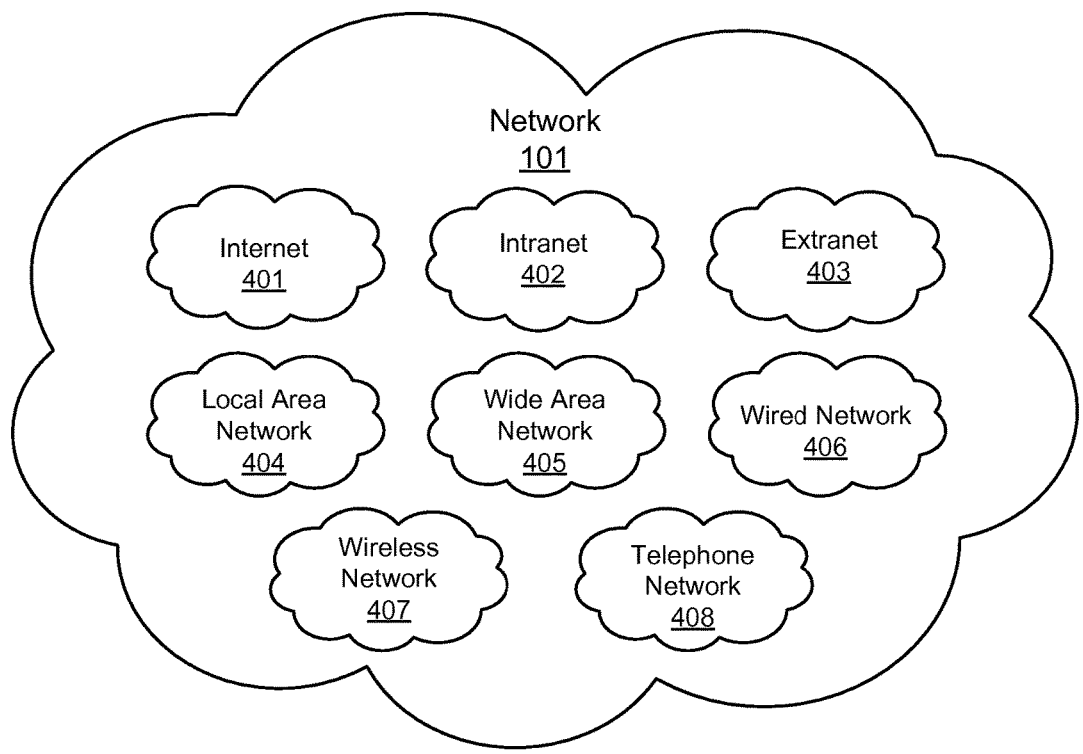
FIG. 4 illustrates possible embodiments of a network.
Figure 5:
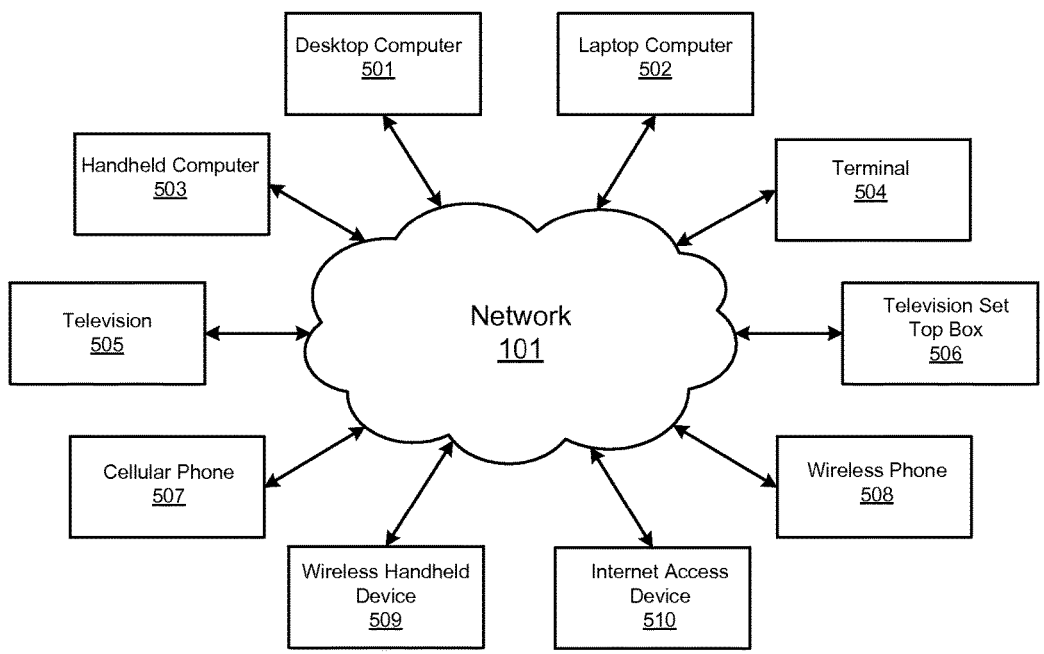
FIG. 5 illustrates possible embodiments of clients connected to a network.

This embodiment places no limitation on network configuration or connectivity. Thus, as non-limiting examples—and as illustrated in FIG. 4—the network 101 could comprise the Internet 401, an intranet 402, and extranet 403, a local area network 404, a wide area network 405, a wired network 406, a wireless network 407, a telephone network 408, any client-server computing architecture, or any combination thereof. The at least one server 102 could be any computer or program that provides services to other computers, programs, or users either in the same computer or over a computer network including, but not limited to, application, communication, mail, database, proxy, fax, file, media, web, peer-to-peer, or standalone servers. As illustrated in FIG. 5, the at least one client 103 may comprise a desktop computer 501, a laptop computer 502, a hand held computer 503, a terminal 504, a television 505, a television set top box 506, a cellular phone 507, a wireless phone 508, a wireless hand held device 509, an Internet access device 510, a rich client, thin client, or any other client functional with a client-server computing architecture.

The Multimedia File Recorder 105 may be controlled by the Control Panel 201, which may comprise means 202 for starting a recording session and means 203 for ending a recording session. The Control Panel 201 may appear on the website 104 as a window with "buttons" that control the operation of the Multimedia File Recorder 105. The buttons may include those labeled "start recording," "end recording," "pause recording," "preview recording," and/or "submit recording." The means 202 for starting a recording session and the means 203 for ending a recording session may comprise a button or icon on the Control Panel 201, or any displayable control that may be functionally linked to the Multimedia File Recorder 105. Control Panel Software 215 for running the Control Panel 201 may comprise a "server-side" architecture (i.e.—reside and operate on the server 102), a "client-side" architecture (i.e.—reside on operate on the client 103), or any combination thereof. Thus, a piece of client-side software may pop up the Control Panel 201 with a set of controls for the user to choose from. Alternatively, a server-side Control Panel 201 may be incorporated into a webpage on the website 104 itself. Irrespective of whether client-side or server-side architecture is used, the Control Panel 201 is communicatively and functionally coupled to the Multimedia File Recorder 105 via the network 101.

The Multimedia File Recorder 105 records at least one multimedia file 216 generated from the client 103. The multimedia file 216 may be a recording of the sounds and/or images generated by the client 103, including, but not limited to, a recording of the client's 103 video or audio output, and/or a collection of screen shots. It may be a compressed or uncompressed text file, audio file, graphics file, animation file, video file, file created by a Screen Capture Tool 205, or any combination thereof. The Multimedia File Recorder 105 may comprise a Screen Capture Tool 205, a Video File Recorder 206, an Audio File Recorder 207, or any combination thereof.

The Screen Capture Tool 205 may generate a multimedia file 216 by recording the client's 103 video output, possibly including images (digital or analog) of the client's 103 monitor (to record the visible items displayed on the monitor or another visual output device). The images may be taken by server-side software, the host operating system, software running on the client 103, or they can also be captured by hardware such as a camera or a device intercepting the video output of the computer. The Screen Capture Tool 205 may comprise one of numerous commercially-available software tools (i.e.—TECHSMITH SNAGIT, CAMTASIA, or USERVIEW), an open-source software solution (i.e.—CAMSTUDIO), or a hardware solution (i.e.—video camera, graphics card, or RGB or DVI frame grabber card). The Multimedia File Recorder's 105 Recording Software 208 may utilize "server-side" architecture (i.e.—reside and operate on the server 102), "client-side" architecture (i.e.—reside and operate on the client 103), or any combination thereof.

A Multimedia File Sender 106 may transmit the multimedia file 216 over the network 101 to a Receiver 204. The Multimedia File Sender 106 may transmit the file 216 automatically, on the Receiver's 204 command, or on the network user's command. Sending Software 209 for running the Multimedia File Sender 106 may comprise a "server-side" architecture (i.e.—reside and operate on the server 102), a "client-side" architecture (i.e.—reside and operate on the client 103), or any combination thereof. The Multimedia File Sender 106 may comprises an email messaging system 210 (that sends a recorded multimedia file 216 as an email attachment to the Receiver 204), a file transfer system 211 (that transfers the multimedia file 216 to a file server 213 accessible by the Receiver 204), a file streaming system 212 (that streams the multimedia 216 file to the Receiver 204 via a Streaming Media Server 214), or any combination thereof. The Multimedia File Sender 106 may also comprise any other system for transmitting files over a network as are known to those skilled in the art.

An email messaging system 210 may be utilized to transmit the multimedia file 216. As used in this Application, "email messaging" is a generic term for the act of transmitting files over a computer network as an attachment to an electronic message. The email messaging system 210 may comprise any type of instant messaging or electronic mail system known to those skilled in the art including, but not limited to those utilizing Simple Mail Transfer Protocol (SMTP), Post Office Protocol (POP), and/or Internet Message Access Protocol (IMAP). They may include multiprotocol instant messaging applications (i.e.—AOL INSTANT MESSENGER, MSN MESSENGER, and/or JABBER), web-based email systems (i.e.—GODADDY WEB-BASED EMAIL, MICROSOFT HOTMAIL, or GOOGLE GMAIL) and client-server email systems (i.e.—MICROSOFT OUTLOOK). Each email system type has advantages that should be taken into consideration. For example, client-server email systems automatically forward emails to a particular client associated with the addressee of the email. Recipients may receive their emails simply by turning on their client, connecting their client to the Internet and using a software package, to view their email. The user may then save any files attached to the email in the client's storage area (i.e—their computer's hard drive or other storage media), or forward the email, with or without the attachment, to other clients. Web-based email systems may be included as part of a website that allows users to log onto the website to receive and transmit their emails. The log in process authenticates the user, typically by asking for a password that only the user knows, to make sure the user should be given access to the emails and their attached files. The advantage of web-based email systems is that users may access their emails and attached files from any client with an Internet connection.

Alternatively, a file transfer system 211 may be utilized to transmit the multimedia file 216 to the Receiver 204. As used in this Application, "file transfer" is a generic term for the act of transmitting files over a computer network. There are numerous ways to transfer files over a network, but they can be generally classified in two categories: (1) "pull-based" file transfers where the receiver initiates a file transmission request; and (2) "push-based" file transfers where the sender initiates a file transmission request. Both types are expressly included in the Applicant's intended definition of "file transfer," which also contemplates transparent file transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMODEM, YMODEM and ZMODEM. Servers that provide a file transfer service are often called file servers. The instant file transfer system 211 may transfer the multimedia file 216 to the file server 213 where it is accessible by the Receiver 204. Any file transfer protocol known to those skilled in the art may be used including, but not limited to: (1) those used with TCP/IP (i.e.—FTAM, FTP, HTTP, RCP, SFTP, SCP, or FASTCopy); (2) those used with UDP (i.e.—TFTP, FSP, UFTP, or MFTP); and/or (3) those used with direct modem connections.

In an alternate embodiment, a file streaming system 212 may be used to transmit the multimedia file 216 to the Receiver 204 via a Streaming Media Server 214. As used in this Application, "file streaming" is a generic term for transmitting a multimedia file 216 over a network 101 as a succession of data elements made available over time. The file streaming system 212 may transmit the multimedia file live (as it is being recorded) or on demand by the Receiver 214. It may utilize commercially-available technology (i.e.—REALPLAYER, APPLE QUICKTIME, and/or MICROSOFT WINDOWS MEDIA PLAYER), open source technology (i.e.—DARWIN STREAMING SERVER, VIDEOLAN, MEDIAFRAME, and/or MPEG4IP), and/or any proprietary or privately-developed streaming media technology. With this embodiment, file transmission may be accomplished by creating a streaming version of the multimedia file 216, uploading the streaming file to a Streaming Media Server 214, and allowing the Receiver 204 to access the file, possibly as a link to the file from a webpage. If the Streaming Media Server 214 is owned or operated by the Receiver 204, direct access to the streaming file may be provided.

Figure 3:
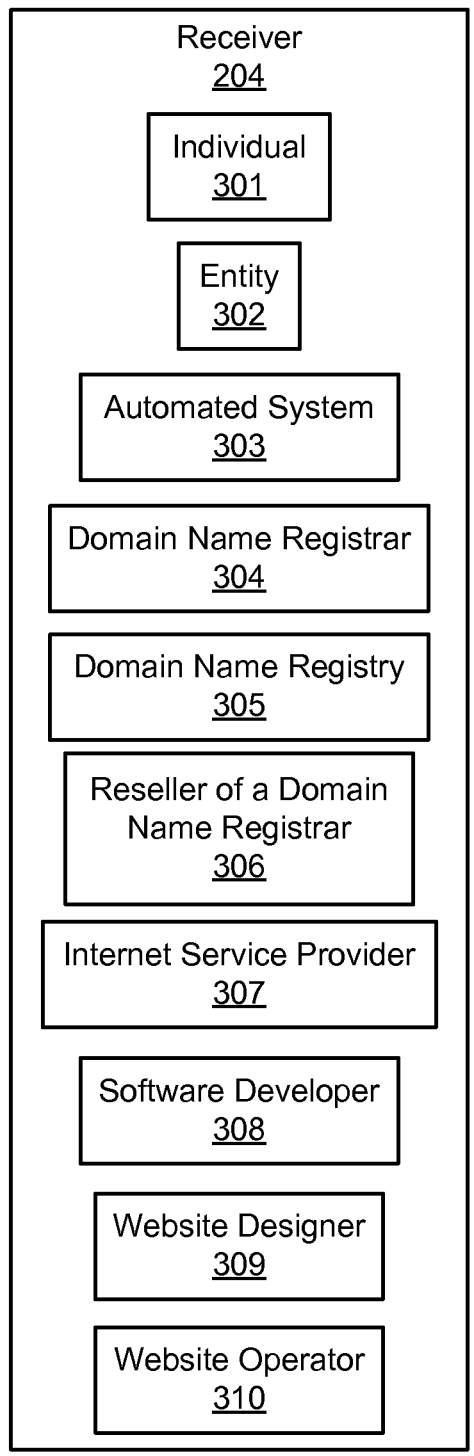
FIG. 3 illustrates possible embodiments of a Receiver.

As illustrated in FIG. 3, the Receiver 204 may be (as non-limiting examples) an individual 301, an entity 302, an automated system 303, a domain name registrar 304, a domain name registry 305, a reseller of a domain name registrar 306, an Internet service provider 307, a software developer 308, a website designer 309, a website operator 310, or any combination thereof.

Figure 6:
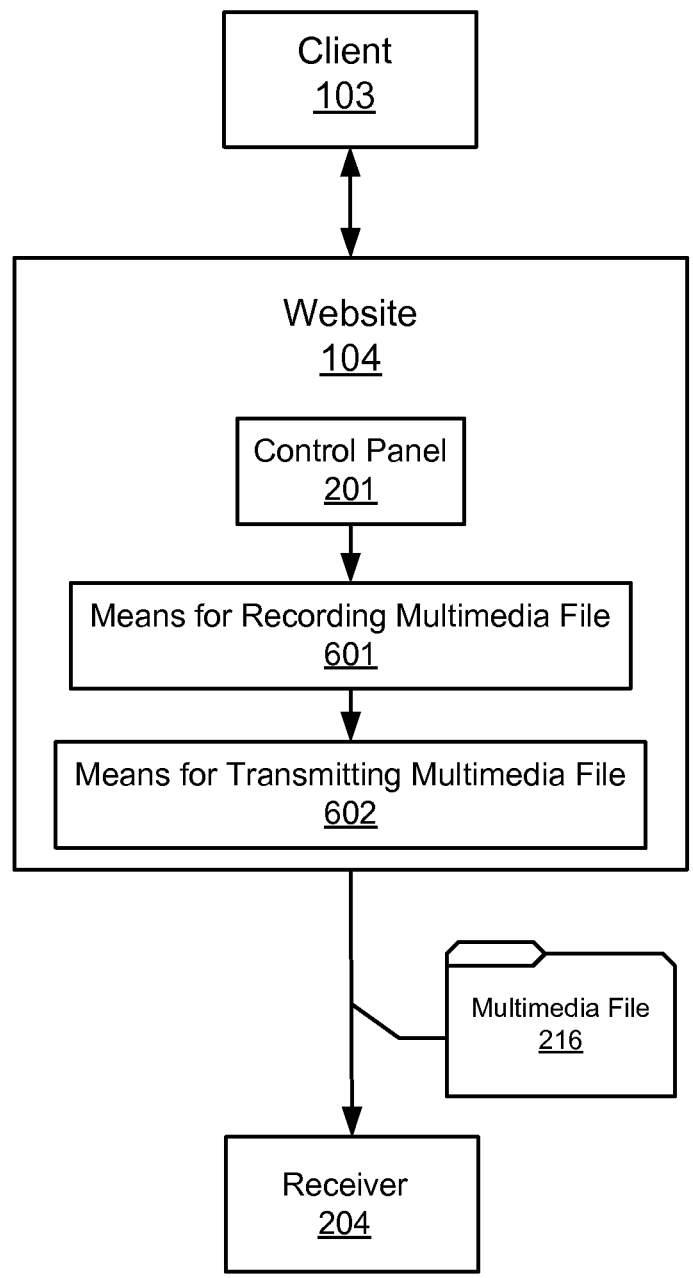
FIG. 6 illustrates a possible embodiment of a system for recording and transmitting a network user's network session.

Another streamlined example embodiment of a system for recording and transmitting a network user's network session is illustrated in FIG. 6. The illustrated embodiment includes a website 104 having means 601 for recording a multimedia file 216 from a client 103, means 602 for transmitting the multimedia file 216 to a Receiver 204, and a Control Panel 201 for controlling the recording means 601.

Figure 7:
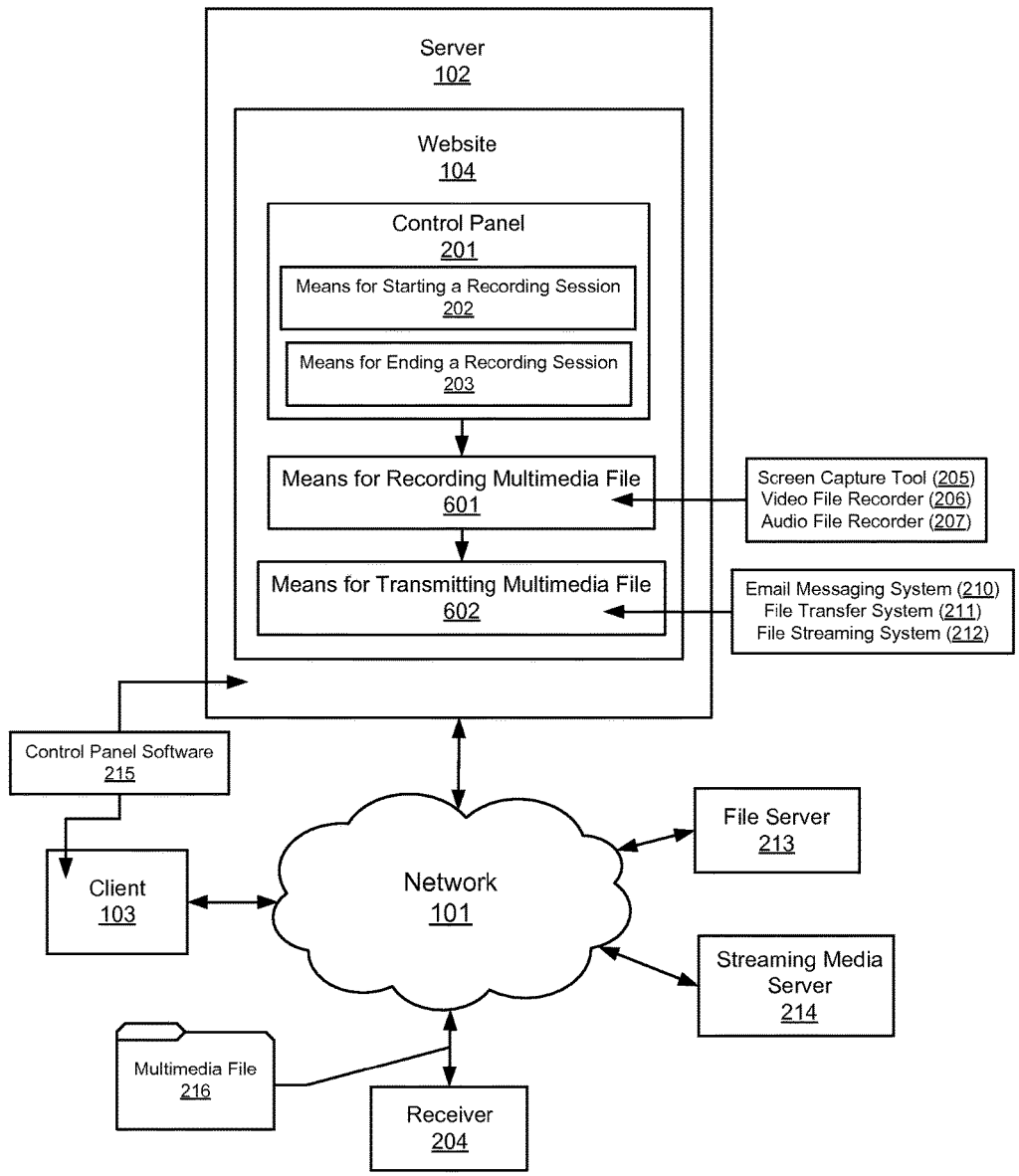
FIG. 7 illustrates a possible embodiment of a system for recording and transmitting a network user's network session.

A more detailed example embodiment of a system for recording and transmitting a network user's network session is illustrated in FIG. 7. The illustrated embodiment includes a client 103 (that may be communicatively coupled to at least one server 102 through a network 101), a website 104 having means 601 for recording a multimedia file 216 from a client 103, means 602 for transmitting the multimedia file 216 to a Receiver 204, and a Control Panel 201 for controlling the recording means 601. The website 104 may be hosted on the at least one server 102. The Control Panel may have means 202 for starting a recording session and means 203 for ending a recording session. The means 601 for recording a multimedia file 216 from a client 103 includes any system or method known to those skilled in the art for recording any output from a client 103 including, but not limited to, text, graphics, audio, video, and/or animation output. The recording means 601 could comprise either a software or hardware solution. As non-limiting examples, the recording means may comprise the above-described Screen Capture Tool 205, a Video File Recorder 206, an Audio File Recorder 207, or any combination thereof. Similarly, the transmitting means 602 may utilize any system or method known to those skilled in the art for transmitting a file over a network. As non-limiting examples, the transmitting means may employ the above-described email messaging system 210 (that sends a recorded multimedia file 216 as an email attachment to the Receiver 204), a file transfer system 211 (that transfers the multimedia file 216 to a file server 213 accessible by the Receiver 204), a file streaming system 212 (that streams the multimedia 216 file to the Receiver 204 via a Streaming Media Server 214), or any combination thereof. The Control Panel Software 215, recording means 601, and/or transmitting means 602 may utilize "server-side" architecture (i.e.—reside and operate on the server 102), "client-side" architecture (i.e.—reside and operate on the client 103), or any combination thereof.

Figure 12:
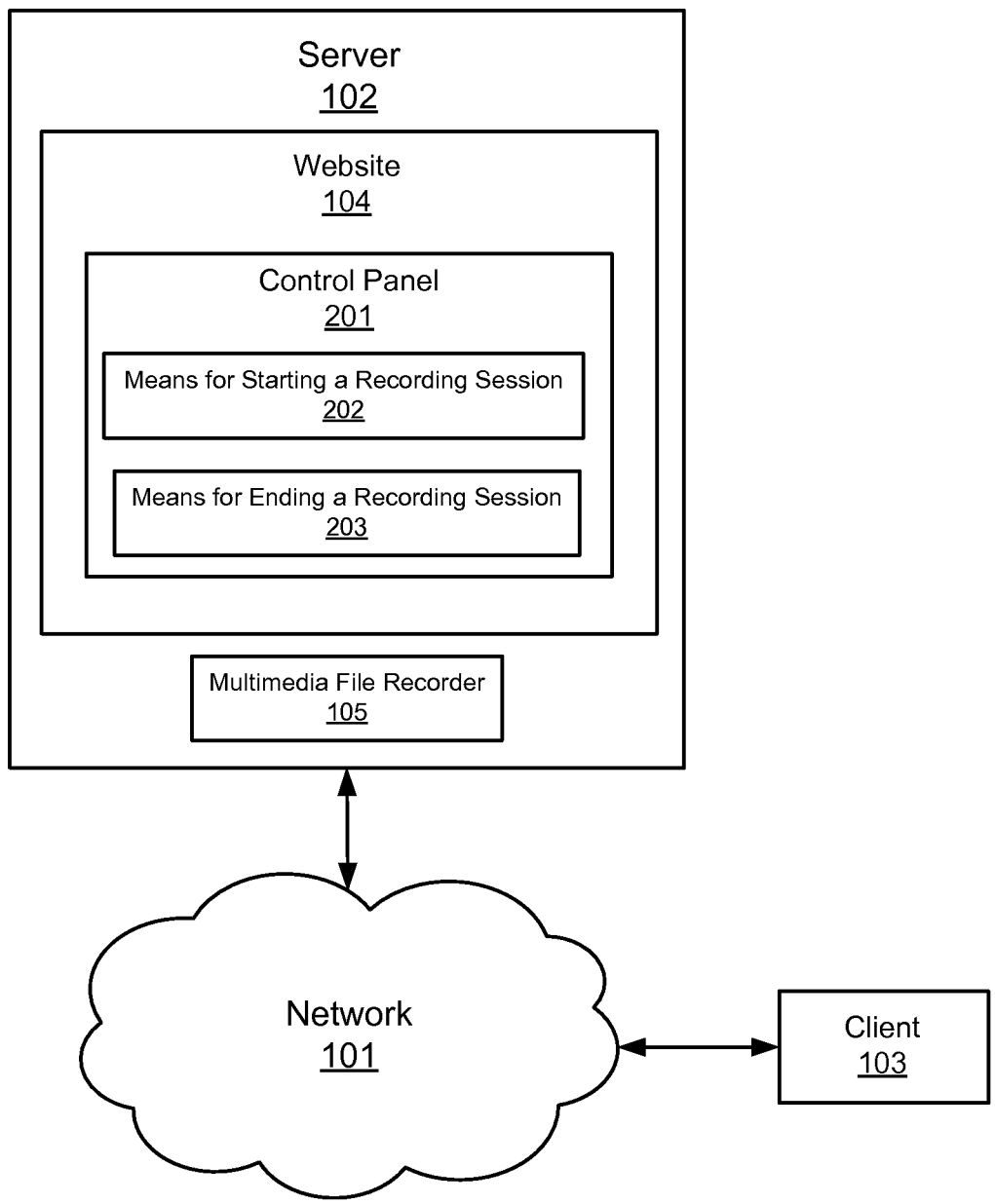
FIG. 12 illustrates a possible embodiment of a system for recording a website user's website session.

An example embodiment of a server-side system for recording a website user's website session is illustrated in FIG. 12. The illustrated embodiment includes a network 101, at least one server 102 and at least one client 103, both connected to the network 101, a Multimedia File Recorder 105 residing on the server 102, and a website 104 accessible though the client 103 comprising a Control Panel 201 for controlling the Multimedia File Recorder 105. The server 102 may host the website 104, thereby providing access to all data and files related to the website 104 and presented to the user through the client 103. The Control Panel 201 also may have means 202 for starting a recording session and means 203 for ending a recording session. Upon receiving instruction from the Control Panel 201, the Multimedia File Recorder 105 may record a stream of data from the server 102 related to a website's user's website session. The stream of data may comprise a text file, an audio file, a graphics file, an animation file, a video file, or any combination thereof. As non-limiting examples, the Multimedia File Recorder 105 may record any data related to the client's 103 video or audio output, including compressed or uncompressed text files, audio files, graphics files, animation files, video files, files created by a Screen Capture Tool 205, or any combination thereof. The Multimedia File Recorder 105 may continue to record until receiving instruction from the Control Panel 201 to end the recording session. The recorded files may be saved in storage on the Server 102 for subsequent use.

Figure 8:
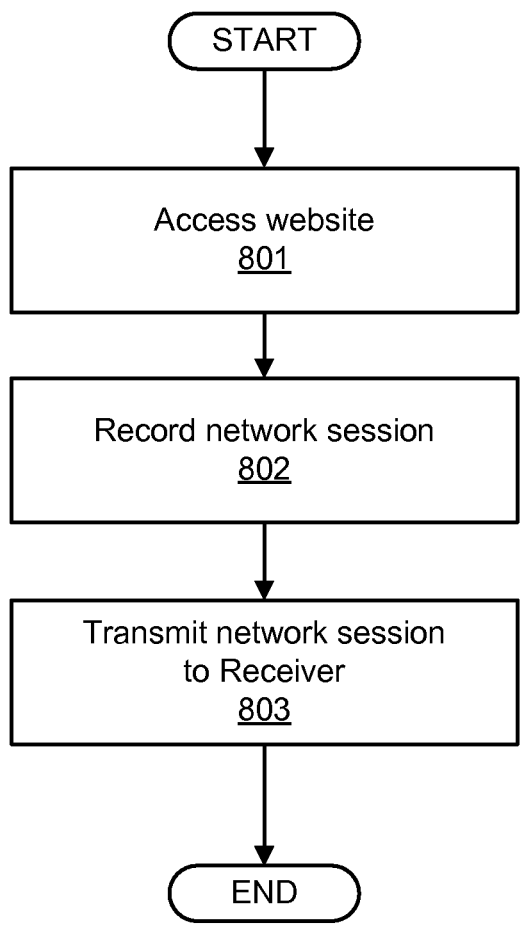
FIG. 8 is a flow diagram illustrating possible steps that may be taken with a system for recording and transmitting a network user's network session.

Several different methods may be used to record and transmit a network user's network session. In a streamlined embodiment illustrated in FIG. 8, a website 104 is accessed (Step 801). A network session is then recorded (Step 802) and the recording of the network session is then transmitted to a Receiver 204 (Step 803).

Figure 9:
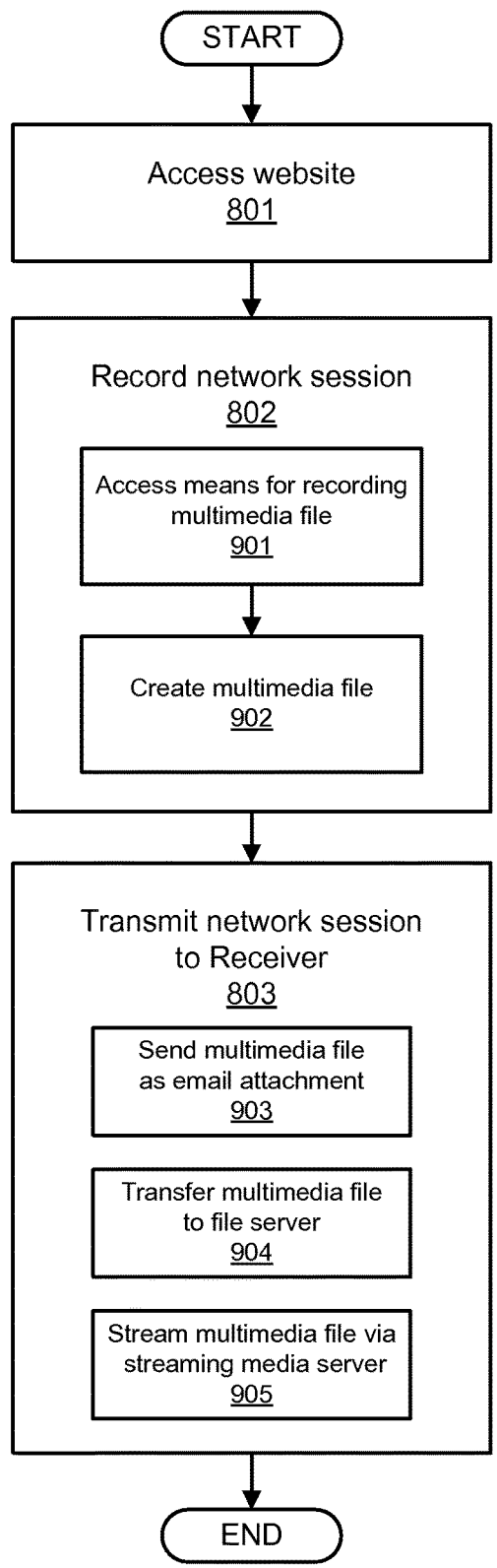
FIG. 9 is a flow diagram illustrating possible steps that may be taken with a system for recording and transmitting a network user's network session.

A more detailed example embodiment of a method of recording and transmitting a network user's network session is illustrated in FIG. 9. In this example embodiment, a website 104 is accessed (Step 801) that may have a Multimedia File Recorder 105, Multimedia File Sender 106, means 601 for recording a multimedia file 216 from a client 103, and/or means 602 for transmitting the multimedia file 216 to a Receiver 204, each of which is described in detail above. A network session is then recorded (Step 802) with any of the multimedia file 216 recording systems discussed above. The recording may be accomplished by accessing means 601 for recording a multimedia file 216 (Step 901) and creating a multimedia file 216 (Step 902). The multimedia file 216 (a recording of the network session) is then transmitted to a Receiver 204 (Step 803). The transmitting step (803) may be accomplished by any method of file transmission known to those of skill in the art including, but not limited to sending the multimedia file 216 as an email attachment (Step 903), transferring the multimedia file 216 to a file server 213 accessible by the Receiver 204 (Step 904), and/or streaming the multimedia file 216 via a Streaming Media Server 214 (Step 905). This step (803) may be accomplished with any of the systems for multimedia file 216 transmission discussed above or known to those skilled in the art.

In yet another example embodiment, an Internet user may record all or some of his experiences using a website 104 and transmit his recording to the website operator 310. As an example, the Internet user may wish to submit his website 104 session to the website operator 310 to obtain help regarding website 104 functionality. Conversely, the website operator 310 may wish to receive such information for usability, quality assurance, or marketing analysis. To record and submit his session, the Internet user may access the website 104 with the browser of his desktop computer 501. The website 104 (viewable on the desktop computer's 501 screen) may pop up a control panel 201 that provides the Internet user with buttons to start and stop a recording session. When the Internet user clicks the "record" button (or a functional equivalent), the Multimedia File Recorder 105 may begin recording the audio and video output of the desktop computer as a multimedia file 216. While the Multimedia File Recorder 105 is recording, the Internet user may access all aspects of the website 104 and its multimedia content. All data from this session may be captured and recorded in the multimedia file 216. When the Internet user wishes to end the recording session, he may click on the "stop recording" button (or a functional equivalent). The website's 104 Multimedia File Sender 106 may then transmit the multimedia file 216 to the website operator 310 as an email attachment or file transfer. Alternatively, the multimedia file 216 may be streamed to the website operator 310 as it is being recorded.

Figure 10:
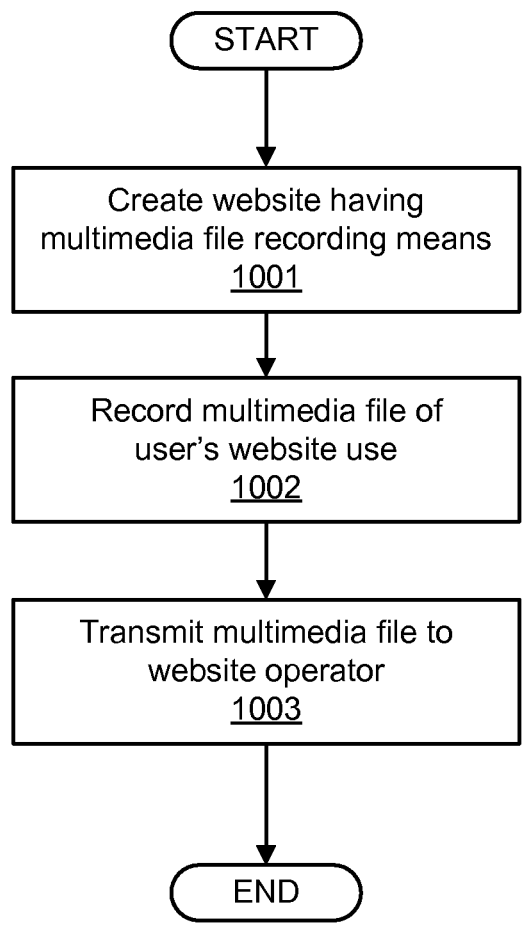
FIG. 10 is a flow diagram illustrating possible steps that may be taken with a method for a website operator to receive a recording of a network user's network session on the website operator's website.

Several different methods may be used for a website operator to receive a recording of a network user's network session on the website operator's website. In a streamlined embodiment illustrated in FIG. 10, a website 104 is created having means 601 for recording a multimedia file 216 (Step 1001). Next, a multimedia file 216 of a network user's session on the website 104 is recorded (Step 1002). Finally, the multimedia file 216 is transmitted to the website's 104 operator (Step 1003).

Figure 11:
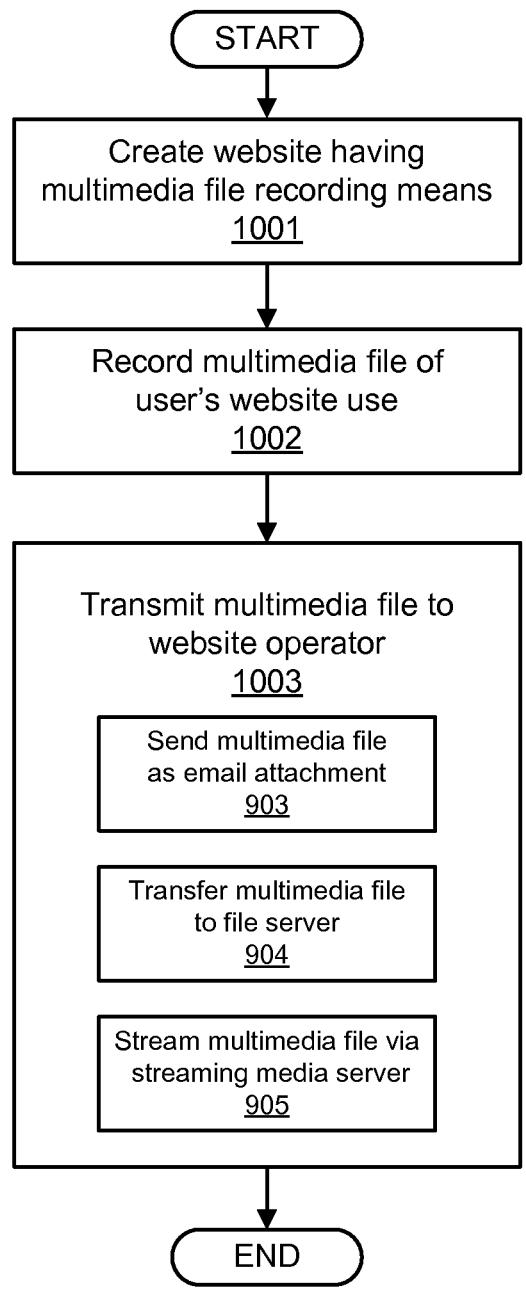
FIG. 11 is a flow diagram illustrating possible steps that may be taken with a method for a website operator to receive a recording of a network user's network session on the website operator's website.

A more detailed example embodiment of a method for a website operator to receive a recording of a network user's network session on the website operator's website is illustrated in FIG. 11. In this example embodiment, a website 104 is created having means 601 for recording a multimedia file 216 (Step 1001). Next, a multimedia file 216 of a network user's session on the website 104 is recorded (Step 1002). The multimedia file may be recorded via any of the multimedia file 216 recording systems or methods previously discussed. Finally, the multimedia file 216 is transmitted to the website's 104 operator (Step 1003). This step (1003) may be accomplished by any method of file transmission known to those of skill in the art including, but not limited to sending the multimedia file 216 as an email attachment (Step 903), transferring the multimedia file 216 to a file server 213 accessible by the Receiver 204 (Step 904), and/or streaming the multimedia file 216 via a Streaming Media Server 214 (Step 905).

Other embodiments and uses of this invention will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising: a processor executing instructions causing a server computer, communicatively coupled to a network, to:
host;
a first software, residing on said server computer, for capturing a navigation usability session;
a second software, residing in part on said server computer and in part on a client, for capturing a navigation;
a website accessible by the client communicatively coupled to the network, the website comprising a Graphical User Interface (GUI) rendered by the server computer to display within a client-side software on the client:
a content within the website including at least one file and a plurality of website data including a website usability instruction, a navigation link, and a product; and
a control panel configured to be displayed as a pop-up window separate from the website content, and as an individual window integrated into the website content, the control panel including:
a start screen capture GUI control;
a stop screen capture GUI control; and
a submit screen capture GUI control;
receive, from a user, via selection of the start screen capture GUI control on the control panel, a request to record a screen capture;
responsive to the request to record, generate a data stream of a series of frame images intercepting, using a screen capture tool, the navigation of the website as displayed on a client monitor, and captured using a client video card, including:
a first user action within the GUI demonstrating a user's understanding of the website usability instruction and the navigation link;
a second user action including a time period during which the product is displayed on the client monitor, and a location of a cursor on the GUI relative to the product; and
a third user action indicating an error as the user navigates the website, including an error type, a severity of the error, and a frequency of the error;
receive, via the stop screen capture GUI control on the control panel, a request to stop the recording;
generate, from the data stream, a multimedia file, compiled as an animation of the series of frame images, comprising a video output of all actions taken by the user;
receive, via the submit screen capture GUI control on the control panel, a request to transmit the multimedia file; and automatically transmit, using an email messaging system comprising Simple Mail Transfer Protocol (SMTP), Post Office Protocol (POP), and/or Internet Message Access Protocol (IMAP) and a third software for transmitting the multimedia file over the network residing in part on said server computer and in part on said client to the server computer operated by an operator of the website, wherein the server computer:

transmits an email, including the multimedia file as an email attachment, to a receiving user;

stores the multimedia file within a file server storage accessible to the receiving user; and streams the multimedia file as a video broadcast accessible to the receiving user via a link configured to access the video broadcast.

2. The system of claim 1, wherein said multimedia file further comprises an audio output generated from said client.

3. The system of claim 1, wherein the data stream is captured from the client via the screen capture tool.

4. The system of claim 3, wherein said multimedia file comprises a file created by the screen capture tool, a text file, a graphics file, an animation file, or a video file.

5. The system of claim 1, further comprising a software for capturing the navigation residing on said client.

6. The system of claim 1, further comprising a software for transmitting the multimedia file residing on said server computer.

7. The system of claim 1, further comprising a software for transmitting the multimedia file residing on said client.

8. The system of claim 1, further comprising an email messaging system that sends said multimedia file as the email attachment.

9. The system of claim 1, further comprising a file transfer system that transfers said multimedia file to the file server.

10. The system of claim 1, further comprising a file streaming system that streams said multimedia file via a streaming media server.

11. The system of claim 1, wherein the multimedia file is transmitted to an individual, an entity, an automated system, a domain name registrar, a domain name registry, a reseller of a domain name registrar, an Internet service provider, a software developer, a website designer, a website operator or any combination thereof.

12. The system of claim 1, wherein said network comprises the Internet, an intranet, an extranet, a local-area network, a wide-area network, a wired network, a wireless network, a telephone network, or any combination thereof.

13. The system of claim 1, wherein the client comprises a desktop computer, a laptop computer, a hand held computer, a terminal, a television, a television set top box, a cellular phone, a wireless phone, a wireless hand held device, or an Internet access device.

14. The system of claim 1, further comprising a software for running the control panel residing on said client.

15. The system of claim 1, further comprising a software for running the control panel residing on said server computer.

16. The system of claim 1, further comprising a software for running the control panel, said software residing in part on said server computer and in part on said client.

17. A system, comprising:

at least one server computer coupled to a network and comprising at least one processor executing specific computer-executable instructions within a memory;

a first software, residing on the at least one server computer, for capturing a navigation usability session;

a second software, residing in part on said at least one server computer and in part on a client, for capturing a navigation;

a website hosted on the at least one server computer communicatively coupled to a network, the website comprising a Graphical User Interface (GUI) rendered by the server computer to display within a client-side software on the client, a content within the website including at least one file and a plurality of website data including a website usability instruction, a navigation link, and a product; and a control panel generated by the at least one server computer, configured to be displayed as a pop-up window separate from the website content, and as an individual window integrated into the website content, and incorporated into the website, the control panel comprising:

a usability session recording user interface control displayed within the website, which, responsive to being selected, causes the at least one server computer to:

receive, from a user, a request to record a screen capture; and generate a data stream of a series of frame images, intercepting, using a screen capture tool, the navigation of the website as displayed on a client monitor, and captured using a client video card, including:

a first user action within the GUI demonstrating a user's understanding of the website usability instruction and the navigation link;

a second user action including a time period during which the product is displayed on the client monitor, and a location of a cursor on the GUI relative to the product; and a third user action indicating an error as the user navigates the website, including an error type, a severity of the error, and a frequency of the error;

a stop recording user interface control, which, responsive to being selected, causes the at least one server computer to generate, from the data stream, a multimedia file, compiled as an animation of the series of frame images, comprising a video output of all actions taken by the user; and a transmit user interface control, which, responsive to being selected, causes the at least one server computer to automatically transmit, using an email messaging system comprising Simple Mail Transfer Protocol (SMTP), Post Office Protocol (POP), and/or Internet Message Access Protocol (IMAP) and a third software for transmitting the multimedia file over the network residing in part on said server computer and in part on said client to the server computer operated by an operator of the website, wherein the server computer:

transmits an email, including the multimedia file as an email attachment, to a receiving user;

stores the multimedia file within a file server storage accessible to the receiving user; and streams the multimedia file as a video broadcast accessible to the receiving user via a link configured to access the video broadcast.

18. The system of claim 17, wherein said control panel further comprises means for starting a recording session and means for ending a recording session.

19. The system of claim 17, wherein said means for recording comprises the screen capture tool, a video file recorder, an audio file recorder, or any combination thereof.

20. The system of claim 17, wherein said multimedia file comprises a file created by the screen capture tool, a text file, a graphics file, an animation file, or a video file.

21. The system of claim 17, wherein said client comprises a desktop computer, a laptop computer, a hand held computer, a terminal, a television, a television set top box, a cellular phone, a wireless phone, a wireless hand held device, or an Internet access device.

22. The system of claim 17, wherein said network comprises the Internet, an intranet, an extranet, a local-area network, a wide-area network, a wired network, a wireless network, a telephone network, or any combination thereof.

23. The system of claim 17, further comprising an email messaging system that sends said multimedia file as the email attachment.

24. The system of claim 17, further comprising a file transfer system that transfers said multimedia file to the file server.

25. The system of claim 17, further comprising a file streaming system that streams said multimedia file via a streaming media server.

26. The system of claim 17, wherein said usability session recording user interface control and said stop recording user interface control on the control panel reside on said server computer.

27. The system of claim 17, wherein said usability session recording user interface control and said stop recording user interface control on the control panel reside on said client.

28. The system of claim 17, wherein said usability session recording user interface control and said stop recording user interface control on the control panel reside in part on said server computer and in part on said client.

29. The system of claim 17, wherein said transmit user interface control on the control panel resides on said server computer.

30. The system of claim 17, wherein said transmit user interface control on the control panel resides on said client.

31. The system of claim 17, wherein said transmit user interface control on the control panel resides in part on said server computer and in part on said client.

32. The system of claim 17, wherein the multimedia file is transmitted to an individual, an entity, an automated system, a domain name registrar, a domain name registry, a reseller of a domain name registrar, an Internet service provider, a software developer, a website designer, a website operator, or any combination thereof.

33. The system of claim 17, further comprising a control panel software residing on said client.

34. The system of claim 17, further comprising a control panel software residing on said server computer.

35. The system of claim 17, further comprising a control panel software residing in part on said server computer and in part on said client.

36. A system, comprising:
a network;
at least one server connected to said network and configured to:
host:
a first software, residing on said server computer, for capturing a navigation usability session;
a second software, residing in part on said server computer and in part on a client, for capturing a navigation;
a website accessible by at least one client communicatively coupled to the network, the website comprising a Graphical User Interface (GUI) rendered by the server computer to display within a client-side software on the client:
a content within the website including at least one file and a plurality of website data including a website usability instruction, a navigation link, and a product; and
a control panel configured to be displayed as a pop-up window separate from the website content, and as an individual window integrated into the website content, the control panel including:
a start screen capture GUI control;
a stop screen capture GUI control; and
a submit screen capture GUI control;
receive, from a user, via selection of the start screen capture GUI control on the control panel, a request to record a screen capture;
responsive to the request to record, generate a data stream of a series of frame images, intercepting, using a screen capture tool, the navigation of the website as displayed on a client monitor, and captured using a client video card, including:
a first user action within the GUI demonstrating a user's understanding of the website usability instruction and the navigation link;
a second user action including a time period during which the product is displayed on the client monitor, and a location of a cursor on the GUI relative to the product; and
a third user action indicating an error as the user navigates the website, including an error type, a severity of the error, and a frequency of the error;
receive, via the stop screen capture GUI control on the control panel, a request to stop the recording;
generate, from the data stream, a multimedia file, compiled as an animation of the series of frame images, comprising a video output of all actions taken by the user;
receive, via the submit screen capture GUI control on the control panel, a request to transmit the multimedia file; and
automatically transmit, using an email messaging system comprising Simple Mail Transfer Protocol (SMTP), Post Office Protocol (POP), and/or Internet Message Access Protocol (IMAP) and a third software for transmitting the multimedia file over the network residing in part on said server computer and in part on said client to the at least one server operated by an operator of the website, wherein the at least one server:
transmits an email, including the multimedia file as an email attachment, to a receiving user;
stores the multimedia file within a file server storage accessible to the receiving user; and
streams the multimedia file as a video broadcast accessible to the receiving user via a link configured to access the video broadcast; and
at least one client connected to said network and configured to display the website and the control panel.

37. The system of claim 36, wherein said control panel comprises means for starting a recording session and means for ending a recording session.

38. The system of claim 37, wherein the at least one server records said multimedia file as a stream of data from said at least one server when so instructed by said control panel.

39. The system of claim 38, wherein said stream of data relates to a website user's website session.

40. The system of claim 39, wherein said stream of data further comprises a text file, an audio file, a graphics file, an animation file, a video file, or any combination thereof.

41. A method, comprising the steps of:
Accessing:
 a first software, residing on said server computer, for capturing a navigation usability session;
 a second software, residing in part on said server computer and in part on a client, for capturing a navigation;
 a website via the client communicatively coupled to a network, the website comprising a Graphical User Interface (GUI) rendered by the server computer to display within a client-side software on the client:
  a content within the website including at least one file and a plurality of website data including a website usability instruction, a navigation link, and a product; and
  a control panel configured to be displayed as a pop-up window separate from the website content, and as an individual window integrated into the website content, the control panel including:
   a start screen capture GUI control;
   a stop screen capture GUI control; and
   a submit screen capture GUI control;
requesting, from a user, via selection of the start screen capture GUI control on the control panel displayed within the website on the at least one client, to record a screen capture;
record a data stream including an animation of a series of frame images intercepting, using a screen capture tool, the navigation of the website as displayed on a client monitor and captured using a client video card, including:
 a first user action within the GUI demonstrating a user's understanding of the website usability instruction and the navigation link;
 a second user action including a time period during which the product is displayed on the client monitor, and a location of a cursor on the GUI relative to the product; and
 a third user action indicating an error as the user navigates the website, including an error type, a severity of the error, and a frequency of the error;
ending, via the control panel, the recording of the navigation; and
automatically transmitting, using an email messaging system comprising Simple Mail Transfer Protocol (SMTP), Post Office Protocol (POP), and/or Internet Message Access Protocol (IMAP) and a third software residing in part on said server computer and in part on said client for transmitting over said network, to the server computer operated by an operator of said website, a multimedia file generated from the data stream and comprising the video output, wherein the server computer:
 transmits an email, including the multimedia file as an email attachment, to a receiving user;
 stores the multimedia file within a file server storage accessible to the receiving user; and
 streams the multimedia file as a video broadcast accessible to the receiving user via a link configured to access the video broadcast.

42. The method of claim 41, wherein said transmitting step further comprises sending said multimedia file as an email attachment.

43. The method of claim 41, wherein said transmitting step further comprises transferring said multimedia file to a file server accessible by said operator of said website.

44. The method of claim 41, wherein said transmitting step further comprises streaming said multimedia file to said operator of said website via a streaming media server.

45. The method of claim 41, wherein said transmitting step automatically transmits said multimedia file.

46. The method of claim 41, wherein the multimedia file is transmitted to an individual, an entity, an automated system, a domain name registrar, a domain name registry, a reseller of a domain name registrar, an Internet service provider, a software developer, a website designer, a website operator, or any combination thereof.

47. A method, comprising the steps of:
hosting:
 a first software, residing on said server computer, for capturing a navigation usability session;
 a second software, residing in part on said server computer and in part on a client, for capturing a navigation;
 a website on at least one server computer communicatively coupled to a network, said website comprising a Graphical User Interface (GUI) rendered by the server computer to display within a client-side software on the client a content within the website including at least one file and a plurality of website data including a website usability instruction, a navigation link, and a product, and a control panel, configured to be displayed as a pop-up window separate from the website content, and as an individual window integrated into the website content, and generated by the at least one server computer and comprising:
  a usability session recording user interface control, which, responsive to being selected, causes the at least one server computer to:
   receive, from a user, a request to record a screen capture; and
   generate a data stream of a series of frame images, intercepting, using a screen capture tool, the navigation of the website as displayed on a client monitor, and captured using a client video card, including:
    a first user action within the GUI demonstrating a user's understanding of the website usability instruction and the navigation link;
    a second user action including a time period during which the product is displayed on the client monitor, and a location of a cursor on the GUI relative to the product; and
    a third user action indicating an error as the user navigates the website, including an error type, a severity of the error, and a frequency of the error;
  a stop recording user interface control, which, responsive to being selected, causes the at least one server computer to generate, from the data stream, a multimedia file, compiled as an animation of the series of frame images, comprising a video output of all actions taken by the user; and
  a transmit user interface control, which, responsive to being selected, causes the at least one server computer to automatically transmit the multimedia file over the network to the server computer operated by an operator of the website, wherein the server computer:

transmits, using an email messaging system comprising Simple Mail Transfer Protocol (SMTP), Post Office Protocol (POP), and/or Internet Message Access Protocol (IMAP) and a third software residing in part on said server computer and in part on said client, an email, including the multimedia file as an email attachment, to a receiving user;

stores the multimedia file within a file server storage accessible to the receiving user; and streams the multimedia file as a video broadcast accessible to the receiving user via a link configured to access the video broadcast.

48. The method of claim 47, wherein said transmitting step further comprises sending said multimedia file as the email attachment to said operator of said website.

49. The method of claim 47, wherein said transmitting step further comprises transferring said multimedia file to the file server accessible by said operator of said website.

50. The method of claim 47, wherein said transmitting step further comprises streaming said multimedia file to said operator of said website via a streaming media server.

\* \* \* \* \*